Jan. 17, 1939.    M. LE ROY    2,143,953
ARTICULATED BEAM
Filed June 24, 1936    3 Sheets-Sheet 1

INVENTOR.
Michel LeRoy,
BY Hoguet, Neary & Campbell,
HIS ATTORNEYS

Jan. 17, 1939. M. LE ROY 2,143,953
ARTICULATED BEAM
Filed June 24, 1936 3 Sheets-Sheet 2

INVENTOR
Michel LeRoy,
BY
HIS ATTORNEYS

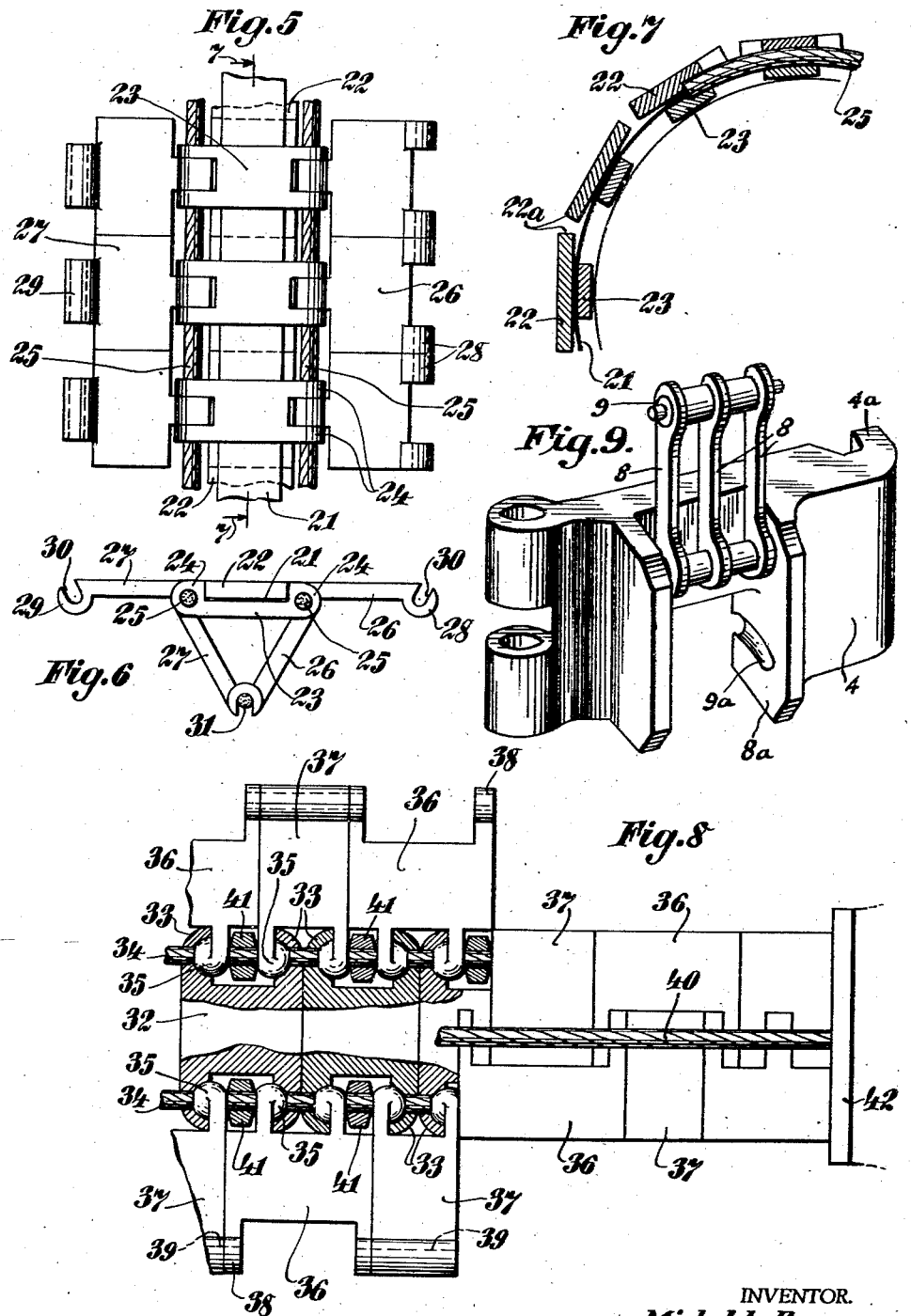

Patented Jan. 17, 1939

2,143,953

UNITED STATES PATENT OFFICE 2,143,953

ARTICULATED BEAM

Michel Le Roy, Asnieres, France

Application June 24, 1936, Serial No. 86,950
In France July 13, 1935

14 Claims. (Cl. 189—37)

This invention relates to an articulated beam which may be rendered rigid in all directions, and has particular reference to an articulated member which is initially flexible in only one plane and which is rendered rigid in that plane in a simple manner.

Heretofore chains have been known which are rigid in all planes except one, namely, a plane perpendicular to the axes of articulation of the links forming the chain. With the articulated beam of the present invention, however, an initially flexible chain is rendered rigid in all directions and is so constructed as to resist longitudinal compressive stresses, tensile stresses, bending stresses about its longitudinal axis, torsion or twisting stresses about its longitudinal axis, and shearing stresses. Inasmuch as the initial form of the articulated beam is a chain, it can be compactly rolled on a reel or the like and when erected it can be extended indefinitely and in any direction.

More particularly, the articulated beam of the present invention comprises an indefinite number of like link members flexibly connected together in end-to-end relation, so as to be flexible in the plane of the axis of articulation and preferably rigid in all other directions or planes, and including one or more shafts extending parallel to the axis of the beam and upon which one or more rigid lateral locking members are pivoted for interlocking association to rigidly connect the articulated link members together in the plane or original flexibility, whereby a beam is formed which is rigid in all directions. When the locking members are disconnected the flexible or articulated chain may be wound on a reel and when it is desired to render it rigid or erect it, the chain is passed through an erecting or transforming device which interlocks the lateral locking members by moving them into locking relationship with respect to the longitudinal axis of the chain about the shafts on which they are pivoted. The locking members may be disconnected from each other whereby the rigid beam is restored to a flexible or articulated chain.

In a preferred embodiment of the invention, the link members forming the original chain comprise rigid blocks pivoted together in end-to-end relation about pivot pins or the like and having short shafts along their lateral edges which align axially with the lateral shafts of the adjacent link members so as to form two continuous shafts. About the lateral shafts of each link member are pivoted locking members, the ends of which are shaped to interlock with each other when associated. The locking members are similarly flexibly connected together. The hubs of the locking members are provided with spiral cams, for engagement by the relatively stationary projection of the erecting device as the chain is passed therethrough. Engagement of the projection with the cam causes the corresponding locking member to be swung into locking relation with the opposite locking member for that chain member so that the flat ends of adjacent link members and locking members abut to form a beam of substantially triangular cross-section, which is held together by the interlock of the complementary ends of the locking members.

In a modified form of the invention the articulated link members, instead of being flexibly pinned together, are secured on a flexible steel tape with the interlocking members pivoted to their lateral edges about continuous pivots which are in the form of a pair of flexible cables. The cooperating ends of the locking members are secured together by a flexible cable similar to the pivot cables, so that the erected structure is triangular in section, each corner of which has a flexible cable.

In a second modification of the invention, the link members are connected together in end-to-end relation on lateral flexible cables extending parallel to the direction of axis of flexibility, whereas the lateral locking members are pivoted on ball and socket joints on the cables in such a way that each lateral locking member lies opposite a joint between the adjacent link members. Thus, when the opposite locking members are erected in the manner described with their complementary free ends connected together with a third flexible cable or the like, the link members are securely locked in abutting relation and a rigid beam of triangular cross-section is formed. Similarly, beams of T, rectangular, or other cross-sectional shapes may be formed.

It will be seen that with the articulated beam of the present invention, the conversion from the flexible state to the rigid state may be effected automatically as the beam is subjected to the action of the erecting or transforming device, so that the articulated beam may be transported compactly on a reel for rapid erection at any place, and for as rapid disassembly, whereby a rigid beam of any length is provided for innumerable uses.

For a more complete understanding of the invention, reference may be had to the accompanying drawings, in which:

Fig. 5 is a plan view of a modified form of the beam of this invention;

Fig. 6 is an end view thereof showing the beam partly erected;

Fig. 7 is a transverse section as seen along the line 7—7 of Fig. 5;

Fig. 8 is a plan view shown partly in section of a second modification of the articulated beam of this invention; and Fig. 9 is an enlarged perspective view of a locking member.

Figure 1:
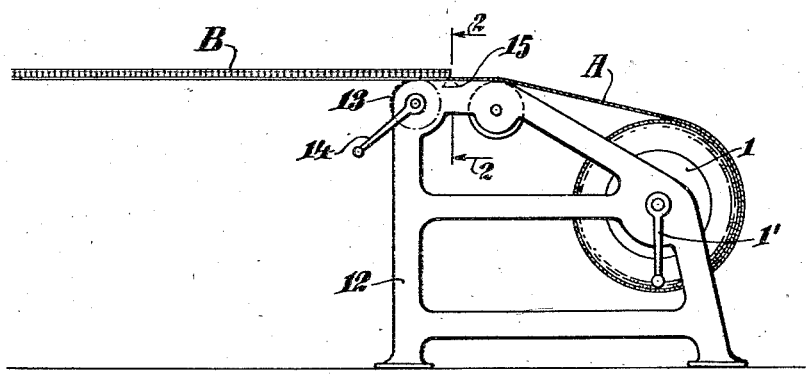
Figure 1 is a diagrammatic representation of the new beam of this invention, a portion of which is illustrated as erected in the form of a beam after passing through the erecting device.
Figure 2:
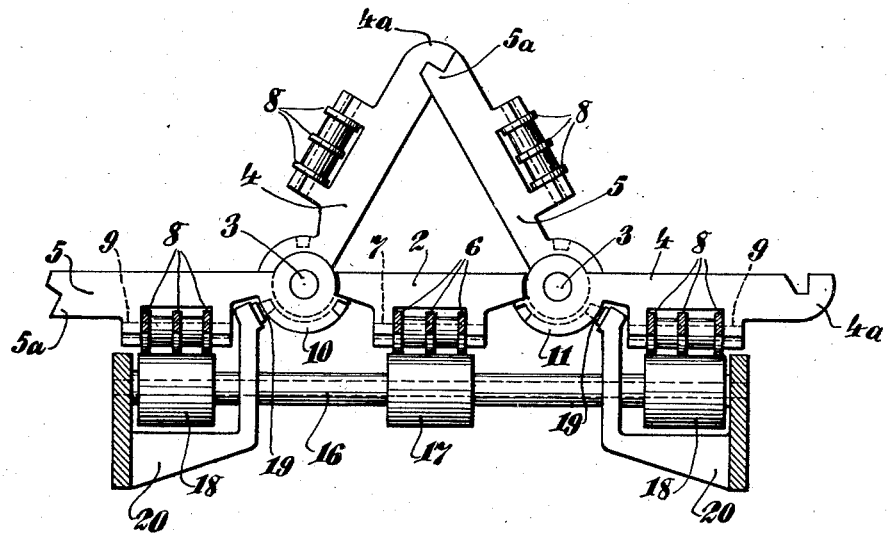
Fig. 2 is a transverse section, as seen along the line 2—2 of Fig. 1 showing certain of the locking members in erected position and others prior to erection.

Referring to Figs. 1 to 4 inclusive of the drawings, the new beam of this invention is preferably wound upon a reel 1, each section of which comprises a central link member 2 having lateral shafts 3 on which are pivoted the laterally extending locking members 4 and 5, the respective ends 4a and 5a of which are shaped with complementary locking portions, as illustrated particularly in Fig. 2. These ends 4a and 5a are so shaped that only when end 5a is properly positioned does 4a interlock therewith. Similarly these ends can be disassociated only when they are properly actuated, 4a moving first and then 5a. While self-interlocking ends of the shape 4a and 5a are preferred, it is plain that other shapes will be effective to produce the same results.

Figure 4:
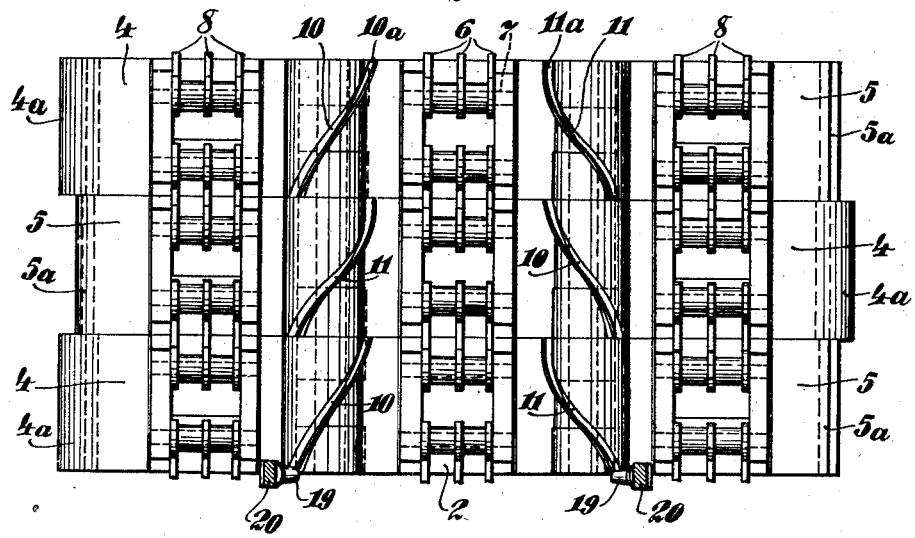
Fig. 4 is a bottom plan corresponding to Fig. 2.

The successive link members 2 are pivoted together in end-to-end relation by links 6 and pins 7, as is shown particularly in Fig. 4, whereby the chain is flexible in a vertical plane as seen in Fig. 2. It will be observed that the abutting ends of the link members 2 are squared, or flat, so that when they are in engagement they support each other in compression. It will also be observed that the short shafts 3 on which the locking members 4 and 5 are pivoted, are in axial alignment, as are the hubs of the corresponding locking members so that the succession of short shafts 3 form, in effect, long lateral shafts. The locking members 4 and 5 are similarly connected together for flexiblity in a vertical plane, as seen in Fig. 2, by means of the links 8 and pins 9, whereby when the members 2, 4 and 5 are developed transversely or flatwise as shown in Fig. 2, the whole assembly forms a chain which is flexible in a plane normal to the plane of pivot pins 7 and 9, which may be wound on the drum 1 in the manner described and illustrated in Fig. 1.

Figure 3:
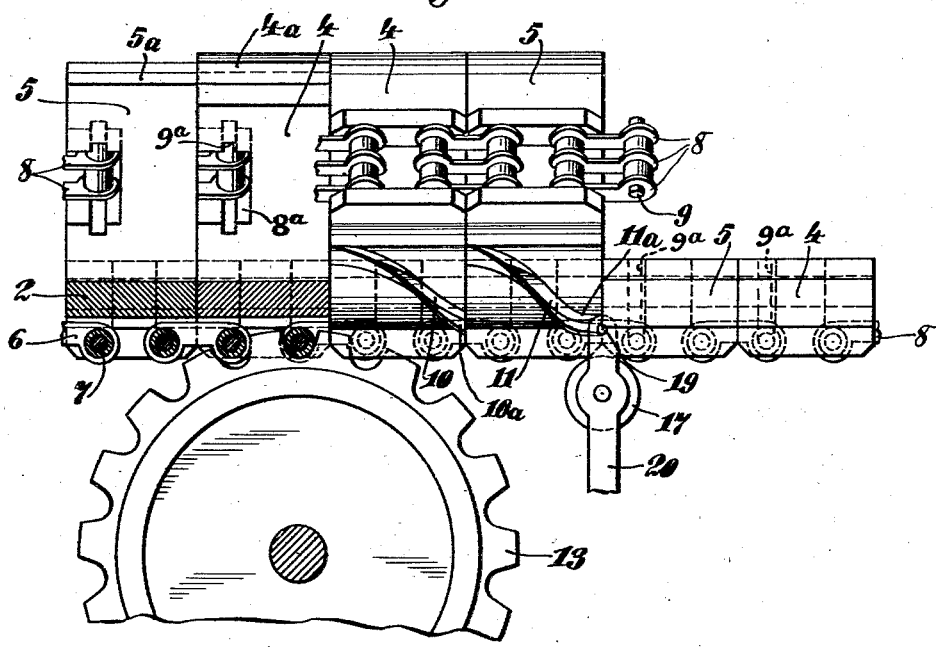
Fig. 3 is an elevation shown partly in section of a beam passing through the erecting device.

Relative movement between the successive locking members 4 and 5 is permitted during development of the device into a rigid beam. The links 8 are pivotally mounted by means of pins 9 at one end only on the trailing or rear edge of locking members 4 and 5. No permanent connection is provided between the free ends of the links 8 and corresponding pins 9 and the leading edge of the next rearwardly disposed locking member 4 or 5. As best shown in Figure 3, the locking member 5 at the left end of the construction carries links 8 and pin 9. Adjacent locking member 4 is provided with a slot 8a of sufficient width to receive the links 8. The opposite walls of slot 8a are provided with grooves 9a receiving the ends of pin 9. Thus locking members 4 and 5 are detachably connected by links 8 for pivotal movement when their edges are in alignment. However, locking member 5 may be moved into angular relationship with respect to adjacent locking member 4, because the links 8 and pins 9 can move out of slot 8a and grooves 9a respectively. Upon angular movement of locking member 4 into the plane of locking member 5, the links 8 and pin 9 will again be received in slot 8a and grooves 9a to connect them.

The hubs of the locking members 4 and 5 are each provided with the spiral fin cams 10 and 11 respectively. The spiral cam 11 of locking member 5 is steeper in pitch than the spiral cam 10 of the opposite locking member 4, and the end 11a of the cam 11 is straight as compared to the end 10a of the cam 10. The purpose of this difference in pitch is to effect the erection of the locking member 5 before its corresponding opposite locking member 4 is erected in order that the respective complementary interlocking ends 4a and 5a of these locking members may come into proper position to effect their interlock in the manner shown in Fig. 2. Similarly, it is preferred that the complementary locking tips 4a and 5a be alternated, that is to say, locking members 5 alternate with locking members 4 on opposite sides of the chain as is illustrated in Fig. 4.

The frame 12 (Fig. 1) may carry the reel 1, and a toothed drum 13 fitted with a crank 14 by which the chain A may be advanced through the erecting mechanism, generally designated 15. This erecting mechanism includes a shaft 16 having three rollers, one central roller 17 engaged by the links 6 and two lateral rollers 18 engaged by the links 8 of the lateral locking members 4 and 5. Projecting into the paths of movement of the spiral cams 10 and 11 of the locking members 4 and 5 on either side are pins 19 suitably supported on brackets 20. With this arrangement, as the chain comprising the link members 2 and the locking members 4 and 5 is advanced past the pins 19 of the locking mechanism 15 by rotation of the crank 14, the pins 19 engage the cams 10 and 11, so as to swing the corresponding locking members 4 and 5 upwardly about pivot pins 3 to bring them into the erected position shown in Fig. 2, whereby their complementary ends 4a and 5a interlock, as shown.

Because of the peculiar interlocking construction of the ends 4a and 5a of the locking members 4 and 5 it is necessary to position locking member 5 near its final erected position before locking member 4 is swung into place. It is for this reason that the spiral cam 11 of locking member 5 is of greater pitch than the spiral cam 10 of locking member 4, and is provided with a straighter end portion 11a. Also, inasmuch as in the preferred form, locking members 4 and 5 alternate on opposite sides of the chain the locking members will move into place alternately because of the pitches of the corresponding spiral fins 10 and 11. As the successive locking members swing into place, each section of the completed beam is held closed not only by the interlocking ends 4a and 5a but by the closely-abutting following section, so that the beam cannot inadvertently open.

With the locking members so erected the structure formed constitutes a rigid beam which may be extended in any direction as is indicated at B in Fig. 1, and extend for any desirable length.

The flat abutting ends of the successive locking members 4 and 5 and the successive link members 2 aid the formation of the rigid structure, and support the beam in compression. In order to disassemble the beam B it is fed to the erecting mechanism 15 in the reverse direction, namely, by rotating crank 20 so that the pins of the erecting mechanism 15 engage cams 10 and 11 to disconnect the interlocking ends 4a and 5a of the corresponding locking members 4 and 5 to restore them to the flat or transverse arrangement A shown in Fig. 2, which is flexible in a vertical plane, as a whole, and this chain may be wound upon the reel 1. The shape of the cam 10 causes the locking member 4 to move first while the movement of locking member 5 is deferred an instant because of the straight portion 11a of its cam 11. In order to assure that the pins 7 and 9 of the interconnecting links 6 and 8 for the link members 2 and locking members 4 and 5 are not only in the same plane in alignment with each other but also in alignment with the axis of the reel 1, the adjacent ends thereof are arranged to engage each other laterally when disposed in the flat or chain relationship. Also the sprocket 13 and the reel 1 may be differentially geared together so as to rotate at the proper relative speeds regardless of the varying diameter of the latter.

In the modification illustrated in Figs. 5, 6 and 7, the flexible central member is constituted by a flexible metal band or strip 21 on which are secured at their transverse center lines, preferably by welding, a series of blocks 22, the flat end surfaces 22a of which are arranged to abut when the band 21 is disposed flatwise. On the rear surface of the band 21 opposite the blocks 20 are welded the relatively narrow members 23, which are accordingly spaced apart lengthwise of the band. These members 23 have lateral lugs 24 through which the continuous flexible cables 25 pass. Pivoted on the cables between the opposite lugs 24 of members 23 are opposite locking members 26 and 27, the former having spaced end lugs 28 between which are adapted to fit closely a projection 29 on opposite locking members 27. The lugs 28 and projection 29 are slotted at 30, so that when the corresponding locking members 26 and 27 are associated the slots in each align, as shown in Fig. 6, for the reception of a third cable 31. The abutting ends of the locking members are flat for compressive contact. The articulated beam thus formed may flex for winding on a reel, as shown in Fig. 7 and when erected as shown in Fig. 6, it is triangular in cross-section and rigid in all directions. The cable 31 locks the ends of the locking members together in erected position (Fig. 6).

In the modification illustrated in Fig. 8, the abutting link members 32 are provided with spaced lateral lugs 33 through which pass the lateral flexible cables 34. The inner surface of lugs 33 are provided with spherical sockets for the reception of balls 35 formed on the inner ends of locking members 36 and 37, the former being provided with end lugs 38, forming a slot between which the narrower opposite locking member 37 is adapted to fit. The ends of these members 36 and 37 are grooved at 39 for the reception of the third locking cable 40 which functions like the cable 31 in Fig. 6. The right hand end Fig. 8 shows the beam erected with the cable 40 performing its locking function. It will be observed that each locking member 36 and 37 is provided with two of the balls 35 through which the cables 34 pass and that the spaced balls of each locking member span the joint between adjacent link members 32, i. e., each locking member is located opposite a joint in the chain formed of the link members 32. Spherical washers 41 are placed between the ball and socket joints of successive members and are located in the notches formed by the lugs 33 of the link members 32. The erection of the device will be readily understood from the foregoing description.

The end of the beam can be secured against disarrangement by any suitable attachment in all of the forms shown, the bracket 42 in Fig. 8 being an example.

It will be seen that the present invention provides an extremely simple arrangement for erecting a rigid beam of any length in a very short time, for the formation of a mast, a bridge, or the like, which is not only rigid against tension and torsion stresses because of its hollow or tubular section, but is also capable of resisting compression stresses because the members constituting it are in abutting end-to-end relation when the beam is erected.

Although a beam of triangular cross-section is shown and preferred, it is to be understood that a T, cross, double T, rectangular, or any other desirable shape lies within the scope of the invention. Also, instead of a single articulated beam, two or more of the beams may be assembled in groups, and the like.

I claim:

1. In an articulated beam, the combination of a plurality of rigid members, means connecting said members together in a continuous chain for rigidity in one plane and flexibility in a plane normal to the first-named plane, locking chains pivoted along the lateral edges of the first chain for adjustment out of said first-named plane about their pivots to render the first chain rigid, means for swinging said locking chains about their pivots to cause their outer edges to engage, and means locking said locking chains in said engaging position.

2. In an articulated beam, the combination of a chain which is flexible in only one plane, a second chain pivoted longitudinally of the first chain and extending normal to the said plane of flexibility of the first chain for flexibility in said plane, whereby adjustment of the second chain about its pivot renders the first chain rigid in said plane, means for swinging said second chain about its pivots, and means for locking said chains together in said adjusted position.

3. In an articulated beam, the combination of a plurality of rigid members connected together in series for flexibility in only one plane, a plurality of locking members pivoted longitudinally of the said series on axes substantially parallel to said plane for adjustment at an angle to the said plane to render the series rigid in said plane, means for swinging said locking members successively about their pivots, and means for locking the locking members in said adjusted position.

4. In an articulated beam, the combination of a plurality of rigid members connected permanently together in series for flexibility in only one plane, locking members pivoted on opposite sides of the said series and successively movable about axes substantially parallel to said plane for adjustment toward each other, means for successively moving said locking members about said axes and means for successively connecting the outer edges of the locking members on the said opposite sides of said series and for connecting the locking members in the series for transforming the flexibly connected members progressively into a rigid beam.

5. In an articulated beam, the combination of a plurality of rigid link members, means connecting said members together in end-to-end permanent, chain relation for flexibility in one plane, locking members pivoted for successive swinging movement on the opposite lateral edges of the link members and normally lying in the same plane therewith, means for swinging said locking members successively out of the plane of said link members and coupling means on the ends of the locking members for interlocking relation with the opposite locking members, whereby movement of the locking members out of the plane of the link members into position for coupling by said coupling means renders the chain rigid in said plane of flexibility.

6. In an articulated beam, the combination of a plurality of rigid link members, means connecting said members together in end-to-end chain relation for flexibility in one plane, locking members pivoted on the opposite lateral edges of the link members and normally lying in the same plane therewith, coupling means on the ends of the locking members for interlocking relation with the opposite locking members, cam means on each locking member, and an abutment adapted to engage said cam members, whereby relative movement of the abutment and the locking members causes the latter to swing about their pivots into position for interlocking relation by said coupling means to convert said chain into a rigid beam.

7. In an articulated beam, the combination of a plurality of rigid link members, means connecting said members together in end-to-end chain relation for flexibility in one plane, locking members pivoted on the opposite lateral edges of the link members and normally lying in the same plane therewith, coupling means on the ends of the locking members for interlocking relation with the opposite locking members, an inclined cam on each locking member, a guide through which the chain is adapted to be passed, an abutment in the path of movement of the cams for engaging the same, and means for advancing the chain through said guide for engaging the cams of successive locking members with said abutment to cause the locking members to swing into interlocking relation about their pivots into a position rendering the chain rigid.

8. In an articulated beam, the combination of a plurality of rigid members pivotally connected in series to form a chain, locking members pivotally connected to the lateral edges of said chain for swinging movement about spaced axes parallel to the longitudinal axis of said chain, means for swinging the locking members toward each other to engage their outer edges, and means for locking the locking members together to prevent relative movement therebetween to form a rigid beam.

9. In an articulated beam, the combination of a plurality of elongated chains, each chain being formed of a plurality of rigid relatively angularly movable members, means pivotally connecting the adjacent lateral edges of the members to allow relative angular movement between each of said chains and successive relative angular movement of the members of the outermost chains about the connecting means, means for moving the members of the outermost chains successively about the connecting means and means for locking successively together the outer edges of the outermost chains and connecting the members of the outermost chains in the series to form the flexible chain members progressively into a hollow rigid beam.

10. In an articulated beam, the combination of a plurality of rigid members, pivotally connected in series to form a chain, rigid locking members pivotally connected to the lateral edges of the rigid members, means disengageably and pivotally connecting the adjacent edges of successive locking members to allow pivotal movement of the rigid members and the locking members in a single plane and successive movement of the locking members out of the plane of the rigid members, means for moving said locking members successively out of the plane of said rigid members and locking means for locking together the locking members at opposite sides of the rigid members to impart rigidity to said chain in all planes.

11. In an articulated beam, the combination of a drum, a plurality of articulated sets of articulated members flexible in a single plane rolled on said drum, and means for unrolling the members from said drum and changing the angular relationship of said members to form a rigid rectilinear beam of triangular section.

12. In an articulated beam, the combination of a plurality of sets of articulated angularly related members forming a rigid beam of triangular section, a drum, and means for changing the angular relationship of the articulated members to render the beam flexible in one plane, and winding it upon the drum.

13. In an articulated beam, the combination of a chain member comprising a series of pivotally connected rigid members, a plurality of rigid locking members pivotally connected to the lateral edges of the chain member for individual angular movement, means for successively moving the locking members angularly about the lateral edges of the chain member and means for successively connecting the outer edges of the locking members on opposite sides of the chain and for connecting the locking members progressively in series to form chains inclined to the chain member, whereby a rigid beam is produced.

14. In an articulated beam, the combination of a winding drum, an articulated member adapted to be wound on said drum and means for winding the member on and unwinding the member from said drum, said member comprising a chain, a plurality of locking members pivotally connected to the lateral edges of the chain and individually movable into the plane of and at an angle to the chain, means responsive to operation of the winding means for moving said locking members and means for locking the locking members in angular relation to the chain to form a rigid beam of substantially triangular cross-section, said articulated member being flexible when the locking members are in the plane of the chain.

MICHEL LE ROY.